United States Patent
Bakos et al.

(10) Patent No.: US 12,124,877 B2
(45) Date of Patent: Oct. 22, 2024

(54) COORDINATING EXECUTION OF COMPUTING OPERATIONS FOR SOFTWARE APPLICATIONS

(71) Applicant: RED HAT, INC., Raleigh, NC (US)

(72) Inventors: Alexandre Porcelli Bakos, Westford, MA (US); Eder Ignatowicz, Cambridge, MA (US)

(73) Assignee: RED HAT, INC., Raleigh, NC (US)

( * ) Notice: Subject to any disclaimer, the term of this patent is extended or adjusted under 35 U.S.C. 154(b) by 540 days.

(21) Appl. No.: 17/402,883

(22) Filed: Aug. 16, 2021

(65) Prior Publication Data
US 2023/0049332 A1 Feb. 16, 2023

(51) Int. Cl.
*G06F 9/50* (2006.01)
*H04L 67/56* (2022.01)

(52) U.S. Cl.
CPC ............ *G06F 9/5027* (2013.01); *H04L 67/56* (2022.05); *G06F 2209/509* (2013.01)

(58) Field of Classification Search
None
See application file for complete search history.

(56) References Cited

U.S. PATENT DOCUMENTS

| | | | | |
|---|---|---|---|---|
| 6,678,715 B1 * | 1/2004 | Ando | ................... | G06F 9/4862 709/201 |
| 7,809,813 B2 * | 10/2010 | Ma | ..................... | G06F 16/9577 709/223 |
| 9,197,720 B2 * | 11/2015 | Fernandez-Ruiz | ....... | G06F 8/60 |
| 10,382,575 B2 * | 8/2019 | Kurita | ........................ | G06F 9/50 |
| 10,616,280 B2 | 4/2020 | Purushothaman | | |
| 10,705,948 B2 | 7/2020 | Ramasamy et al. | | |
| 2003/0149720 A1 * | 8/2003 | Goldstein | ................. | H04L 9/40 709/202 |
| 2004/0006653 A1 * | 1/2004 | Kamen | ................... | H04L 67/51 719/330 |
| 2005/0076339 A1 | 4/2005 | Merril et al. | | |

(Continued)

OTHER PUBLICATIONS

Jeong et al.; "Offloading of Web Application Computations: A Snapshot-Based Approach"; 015 IEEE 13th International Conference on Embedded and Ubiquitous Computing; (Jin_2015.pdf; pp. 90-97) (Year: 2015).*

(Continued)

*Primary Examiner* — Hiren P Patel
(74) *Attorney, Agent, or Firm* — Kilpatrick Townsend & Stockton LLP (57) ABSTRACT

A client-side system can include a service proxy that can receive a request to perform a computing operation from a web application that is executable in a web browser of the client-side system. The service proxy can determine if the computing operation is executable by a local execution module that is external to the web browser and local to the client-side system. The local execution module may be different from the web application and may be configured to execute one or more computing operations using computing resources local to the client-side system. If the computing operation is executable by a local execution module, the service proxy can transmit a communication to the local execution module for causing the local execution module to execute the computing operation.

18 Claims, 4 Drawing Sheets

(56) References Cited

U.S. PATENT DOCUMENTS

| | | | | |
|---|---|---|---|---|
| 2008/0148298 | A1* | 6/2008 | Chatterjee | G06F 21/54 |
| | | | | 719/328 |
| 2013/0138473 | A1 | 5/2013 | Balko et al. | |
| 2013/0151594 | A1* | 6/2013 | Fernandez-Ruiz | G06F 8/61 |
| | | | | 709/203 |
| 2013/0159377 | A1 | 6/2013 | Nash | |
| 2013/0340045 | A1* | 12/2013 | Wouhaybi | G06F 21/10 |
| | | | | 726/4 |
| 2014/0280509 | A1* | 9/2014 | Merrells | H04L 67/02 |
| | | | | 709/203 |
| 2016/0285780 | A1* | 9/2016 | Strijkers | H04W 88/02 |
| 2018/0176097 | A1* | 6/2018 | Russell | H04L 41/22 |
| 2018/0322136 | A1* | 11/2018 | Carpentier | G06F 16/188 |
| 2019/0104194 | A1* | 4/2019 | Imm | H04L 67/01 |
| 2019/0158569 | A1* | 5/2019 | Singleton, IV | H04L 67/75 |
| 2020/0296609 | A1* | 9/2020 | Rayavarapu | H04W 8/245 |
| 2022/0417289 | A1* | 12/2022 | Azulay | H04L 63/1475 |

OTHER PUBLICATIONS

Zhang et al.; "A Heterogeneous Auto-Offloading Framework Based on Web Browser for Resource-constrained Devices"; 2009 Fourth International Conference on Internet and Web Applications and Services; (Zhang_2009.pdf; pp. 193-199) (Year: 2009).*

"Web-based tooling for BPMN (toolkit/bpmn-js), DMN (toolkit/dmn-js) and Forms (toolkit/form-js)," Camunda Services GmbH, 2020, https://bpmn.io/.

Coombs, C., et al., "The strategic impacts of Intelligent Automation for knowledge and service work: An interdisciplinary review," Journal of Strategic Information Systems, 2020, https://www.sciencedirect.com/science/article/pii/S0963868720300081.

* cited by examiner

FIG. 4

COORDINATING EXECUTION OF COMPUTING OPERATIONS FOR SOFTWARE APPLICATIONS

TECHNICAL FIELD

The present disclosure relates generally to executing computing operations on computing systems. More specifically, but not by way of limitation, this disclosure relates to coordinating the execution of computing operations associated with web applications and other applications on computing systems.

BACKGROUND

Users of computing systems may interact with various software applications, such as web applications executing in a web browser of the computing system. These user interactions may cause the software application to generate requests for performing various computing operations, some of which may be computationally intensive operations. A computationally intensive operation can be a computing operation that consumes a large number of computing resources (e.g., processing power, memory, and storage) relative to other computing operations associated with the same application. The software application may transmit such requests to a backend server that is configured to handle the computing operations. The backend server can execute the computing operations and provide the results back to the software application.

DETAILED DESCRIPTION

User interactions with software applications may trigger the execution of computing operations, such as computationally intensive operations. Certain kinds of software applications, such as web applications, may interface with remote servers for performing such operations. For example, a remote server can execute the computing operations and return the results of the computing operations back to the software application. But communicating with a remote server may increase latency and decrease the responsiveness of the software application. For example, if the computing operation involves updating a model, the entire model may need to be transmitted to the remote server along with a request for the update operation. And in some cases, the model may be tens of megabytes (MB) or more in size. Transmitting and receiving such large amounts of data may significantly increase latency and reduce the apparent responsiveness of the software application. This approach also requires the remote server, which adds costs and complexity to the system. For example, a service provider may need to deploy, continually update, and otherwise maintain a cloud computing system capable of concurrently servicing millions of application requests from thousands of users worldwide, which has its own set of costs and challenges for the service provider.

Some examples of the present disclosure can overcome one or more of the abovementioned problems via a service proxy that can cause a computing operation to be executed by either a local execution module or a remote server-side system depending on the capabilities of the local execution module. In particular, the service proxy can receive a request for performing the computing operation from a software application running on a client-side system. The service proxy can then determine whether the local execution module running on the client-side system can execute the computing operation. In some examples, the local execution module may be software (e.g., a daemon process) executing in the background of the client-side system and capable of leveraging the local computing resources of the client-side system to execute requested operations. If the service proxy determines that the local execution module cannot execute the computing operation (e.g., due to lack of sufficient computing resources on the local client-side system), the service proxy can transmit a communication associated with the computing operation to the server-side system, which can execute the computing operation and return the results thereof. Alternatively, if the service proxy determines that the local execution module can execute the computing operation, the service proxy can transmit a communication the local execution module, which can execute the computing operation using the local computing resources of the client-side system. Using these techniques, some computing operations may be handled locally while others may be handled remotely, depending on the capabilities of the local execution module. By handling some computing operations (e.g., computationally intensive operations) locally, latency may be reduced and the application's responsiveness may be improved. Also, the amount of data transmitted between the software application and the remote server-side system may be reduced. This can decrease the bandwidth consumption, costs, and computational requirements of the server-side system.

In some examples, the service proxy may dynamically switch execution of computing operations between the local execution module and the server-side system. For example, the service proxy may determine that some computing operations (e.g., those that require lots of data or computing resources) may be executed by the local execution module and other computing operations may be executed by the server-side system. This may significantly improve the responsiveness of the software application. In some examples, a user of the client-side system may disable or enable the service proxy and the local execution module as desired, for example depending on the performance of the software application or security concerns.

In one example, a client-side system can execute a web application in a website browser. A user may interact with the web application in various ways, such as to create or update complex models (e.g., simulations, mathematical models, or machine-learning models). For example, the user may interact with the web application to add a new variable to a model. The user interaction may trigger the performance of a computing operation to add the new variable to the model. To effectuate performance of the computing operation, the web application can transmit a request (e.g., an HTTP request) associated with the computing operation. In some examples, the request may be initially destined for a server-side system, for example so that the server-side system can execute the computing operation. But, the request can be intercepted by the service proxy before it is sent to the server-side system. This may allow the service proxy to operate relatively transparently to the web application. Alternatively, the web application can intentionally transmit the request to the service proxy. Either way, the service proxy can receive the request and determine if a local execution module associated with the web application is installed on the client-side system.

If the local execution module is installed on the client-side system, the service proxy may next determine if the local execution module can execute the requested computing operation. If the local execution module can execute the computing operation, the service proxy may transmit a communication indicating the computing operation to the local execution module. Depending on the computing operation, the service proxy may also transmit additional data related to the computing operation to the local execution module. Upon receiving the communication, the local execution module can execute the computing operation and return the results of the computing operation to service proxy, which in turn can forward the results to the web application. On the other hand, if the local execution module cannot execute the computing operation, the service proxy may transmit a communication indicating the computing operation to the server-side system. Depending on the computing operation, the service proxy may also transmit additional data related to the computing operation to the server-side system. The server-side system may execute the computing operation and transmit the results of the computing operation to the service proxy, which may forward the results to the web application in the client-side system. Alternatively, the server-side system may communicate the results to the web application more directly, without going through the service proxy as an intermediary.

If the service proxy determines that the local execution module is not installed on the client-side system, the client-side system may prompt a user of the client-side system for permission to install the local execution module. If the user provides permission to install the local execution module, the client-device system may obtain the local execution module from a remote server and install the local execution module. The remote server may be the server-side system described above (that can execute computing operations on behalf of the web application) or another server. For example, the local execution module may be downloadable from the server-side system that provides the web application to the client-side system. The server-side system may transmit the local execution module to the client-side system for installation thereon. The client-side system may install and enable the local execution module for use in executing computing operations.

These illustrative examples are given to introduce the reader to the general subject matter discussed here and are not intended to limit the scope of the disclosed concepts. The following sections describe various additional features and examples with reference to the drawings in which similar numerals indicate similar elements but, like the illustrative examples, should not be used to limit the present disclosure.

Figure 1:
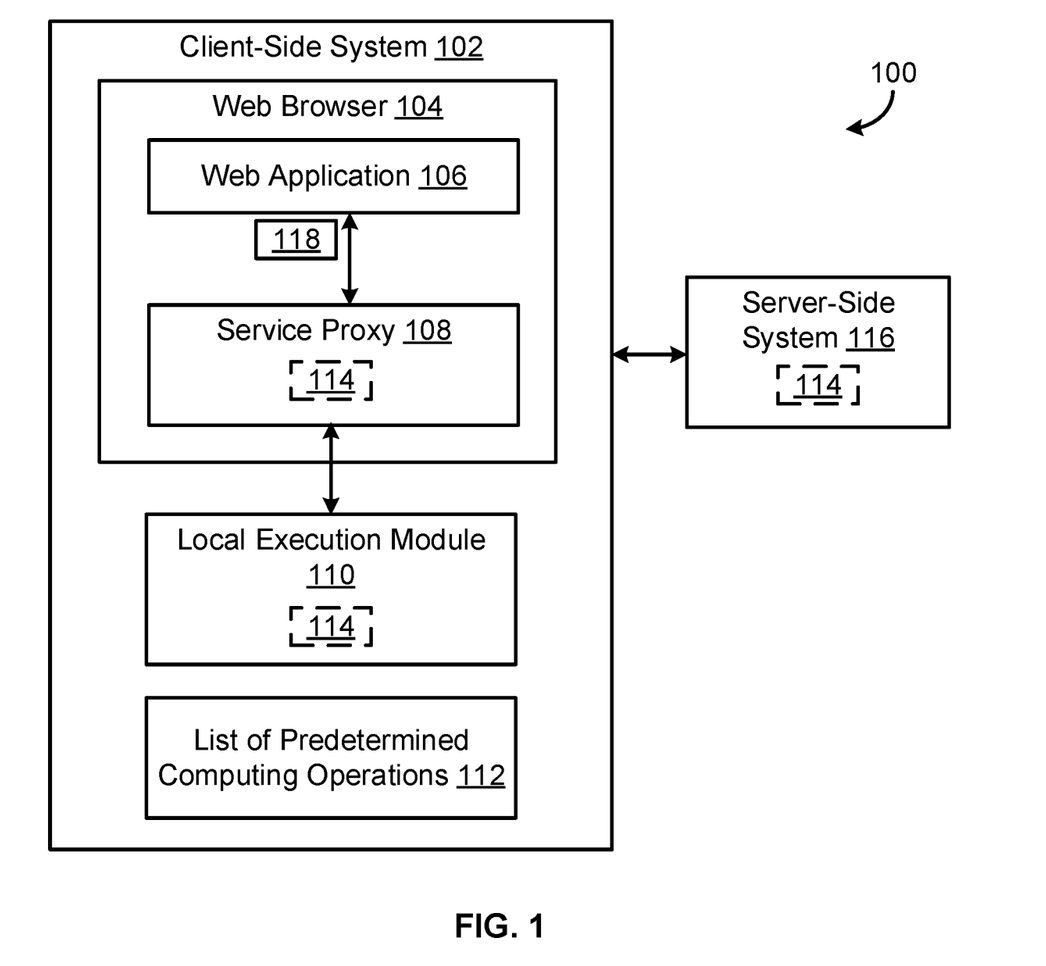
FIG. 1 is a block diagram of an example of a computing environment with software for coordinating the execution of computing operations according to some aspects of the present disclosure.

FIG. 1 is a block diagram of an example of a computing environment 100 with software for coordinating the execution of computing operations according to some aspects of the present disclosure. In this example, the computing environment 100 includes a client-side system 102. The client-side system 102 includes a web browser 104 in which a web application 106 can execute. But in other examples, the client-side system 102 can include other types of applications for which the principles described herein may be applied.

The client-side system 102 can include one or more computing devices. For example, the client-side system 102 may include one or more desktop computers, servers, or mobile devices (e.g., laptop computers, tablets, or mobile phones). In some examples, the client-side system may be a computing cluster or another network of computing devices.

A user can operate the client-side system 102 to interact with the web application 106 via the web browser 104. In some examples, the user may interact with the web application 106 after the web application 106 is rendered in the web browser 104. Interacting with the web application 106 may cause the web application 106 to generate a request 118 for a corresponding computing operation 114. For example, if the web application 106 is an e-mail client, chat client, or text message client, the request 118 for a computing operation 114 may be triggered by the user inputting an initial part of a message into an input box. The request 118 may, for example, cause a prediction engine associated with the web application 106 to predict and suggest the next word for inclusion in the message based on the initial part of the message input by the user.

After generating the request 118, the web application 106 may transmit the request 118. The request 118 may be received by a service proxy 108, which can be separate from the web application 106. The service proxy 108 can be executed within the web browser 104. The service proxy 108 may be run as a background process on the client-side system 102.

The service proxy 108 may receive the request 118 and determine if the requested computing operation 114 is executable by the local execution module 110, for example by accessing a list of predetermined computing operations 112 that are executable by the local execution module 110. In some examples, the list of predetermined computing operations 112 may be persistently stored on the client-side system 102. For example, the list of predetermined computing operations 112 may be stored in a non-volatile memory of the client-side system 102. In other examples, the list of predetermined computing operations 112 may be obtained from a remote server, such as a server-side system 116, that is external to the client-side system 102. The client-side system 102 may access the list of predetermined computing operations 112 by communicating with the remote server via a network, such as the Internet. In some examples, the local execution module 110 may transmit a request (e.g., via an application programming interface) that includes an identifier of the computing operation 114 to the remote server. The remote server can receive the request, determine whether the computing operation 114 is executable by the local execution module 110 (e.g., based on the list of predetermined computing operations 112), and transmit a response to the service proxy 108 indicating whether the computing operation 114 is executable by the local execution module 110.

If the service proxy 108 determines that the computing operation 114 is executable by the local execution module 110, the service proxy may forward the request 118 for the computing operation 114 to the local execution module 110. The local execution module 110 is a software application executing in the client-side system 102 outside of the web browser 104. An example of the local execution module 110 may be a daemon program that may run as a background process on the client-side system 102 (e.g., rather than being under direct control of the user). The local execution module 110 may listen for requests 118 for computing operations 114 on a specific port of the client-side system 102. Such requests 118 may be transmitted to the port by the service proxy 108. Upon receiving such a request 118, the local execution module 110 can execute the computing operation 114 using the local computing resources of the client-side system 102. Examples of the local computing resources can include processing power, memory, and storage. Computing resources can be considered local to the client-side system 102 if they are provided by one or more computing devices internal to the client-side system 102.

If the service proxy 108 determines that the computing operation 114 is not executable by the local execution module 110, the service proxy 108 may forward the request 118 for the computing operation 114 to the server-side system 116. The server-side system 116 may include one or more computing devices, such as individual servers or groups of servers operating as a cluster or in an otherwise distributed manner. The server-side system 116 can receive the request 118 transmitted by the service proxy 108 and responsively perform the requested computing operation 114. The server-side system 116 can then return the results of the computing operation 114 to the service proxy 108 or the web application 106.

In some examples, the server-side system 116 may be the same server-side system that provided the web application 106 to the web browser 104 of the client-side system 102. For example, the server-side system 116 may include one or more web servers that host the web application 106. The web servers can provide the web application 106 to client devices upon receiving requests (e.g., HTTP requests) for the web application 106 via web browsers. Alternatively, the server-side system 116 may be a different server-side system than the one that provided the web application 106 to the web browser 104. For example, the server-side system 116 may include one or more backend servers dedicated for performing computing operations 114 associated with the web application 106.

In some examples, the client-side system 102 may determine whether the local execution module 110 is installed on the client-side system 102. For example, the service proxy 108 or the web application 106 can scan the software on the client-side system 102 to determine whether the local execution module 110 is installed. This may take place prior to, or in response to, the web application 106 being rendered in the web browser 104. If the local execution module 110 is not installed on the client-side system 102, the client-side system 102 can prompt the user of the client-side system 102 for permission to install the local execution module 110 onto the client-side system 102. For example, the service proxy 108 or the web application 106 may display the prompt to the user. If the client-side system 102 receives permission from the user, the client-side system 102 may transmit a request for obtaining the local execution module 110 to a remote server, such as the server-side system 116 that is providing the web application 106 to the client-side system 102. The remote server can receive the request and responsively transmit the local execution module 110 to the client-side system 102. The client-side system 102 may then install the local execution module 110 onto the client-side system 102.

In some examples, the client-side system 102 may determine that the local execution module 110 is not installed on the client-side system 102 and that the server-side system 116 is unavailable. For example, the server-side system 116 may be unavailable due to an outage. So, the service proxy 108 may determine that the computing operation 114 may not be performed. The web application 106 may continue being executed without receiving the results of the computing operation 114.

Although FIG. 1 shows a certain number and arrangement of components, it will be appreciated that this is intended to be illustrative and non-limiting. Other examples may include more components, fewer components, different components, or a different arrangement of the components shown in FIG. 1. For instance, the principles described above may be applied to another type of software application that is different from a web application in another example. And although the service proxy 108 is depicted in FIG. 1 as separate from the local execution module 110, in other examples these two components can be combined such that the service proxy 108 can implement the functionality of the local execution module 110 (or vice-versa).

Figure 2:
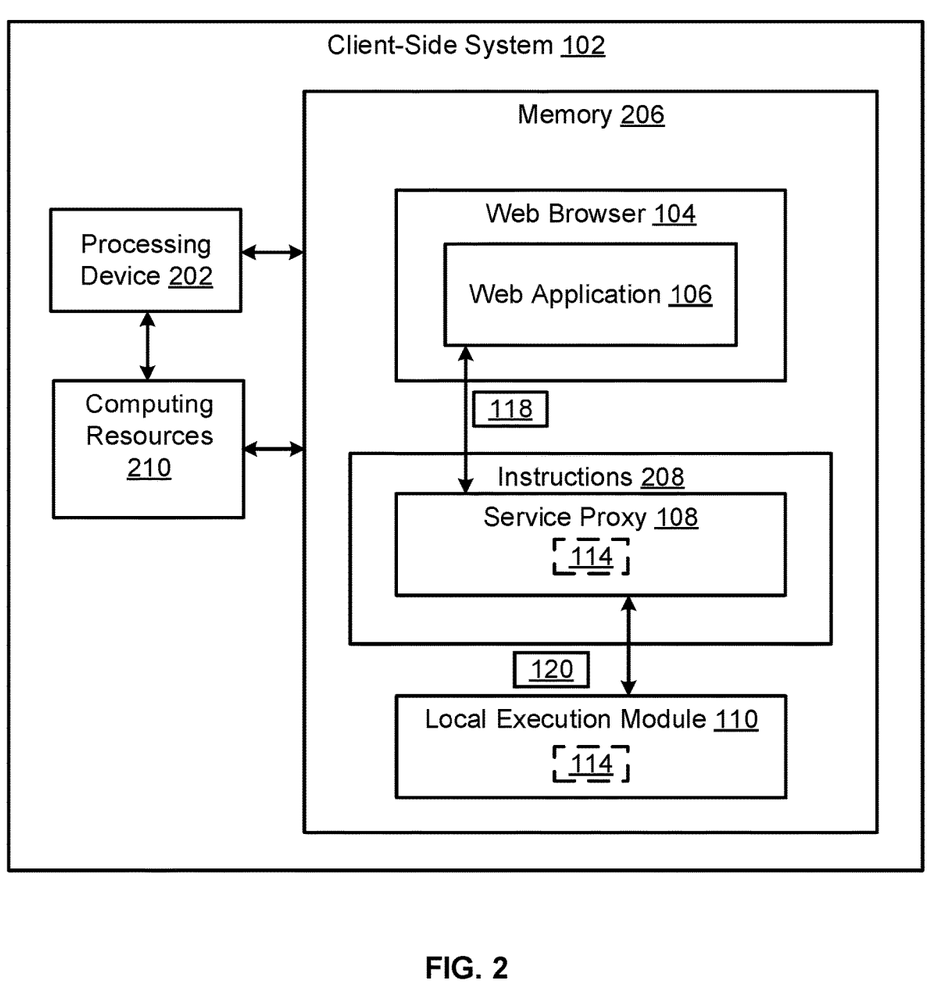
FIG. 2 is a block diagram of an example of a client-side system including software for coordinating the execution of computing operations according to some aspects of the present disclosure.

FIG. 2 is a block diagram of an example of a client-side system 102 including software for coordinating the execution of computing operations according to some aspects of the present disclosure. The client-side system 102 includes a processing device 202 communicatively coupled to a memory 206. In some examples, the components of the client-side system 102, such as the processing device 202 and the memory 206, may be part of a same computing device. In other examples, the processing device 202 and the memory 206 can be included in separate computing devices that are communicatively coupled. The client-side system 102 may also include computing resources 210 that are local to the client-side system 102 and that can be accessed by the local execution module 110 for executing a computing operation requested by the web application 106. Examples of the computing resources 210 can include processing power, memory (e.g., random access memory), storage (e.g., disk space), or any combination of these.

The processing device 202 can include one processor or multiple processors. Non-limiting examples of the processing device 202 include a Field-Programmable Gate Array (FPGA), an application-specific integrated circuit (ASIC), a microprocessor, etc. The processing device 202 can execute instructions 208 stored in the memory 206 to perform computing operations. In some examples, the instructions 208 can include processor-specific instructions generated by a compiler or an interpreter from code written in any suitable computer-programming language, such as C, C++, C#, etc.

The memory 206 can include one memory or multiple memories. The memory 206 can be non-volatile and may include any type of memory that retains stored information when powered off. Non-limiting examples of the memory 206 include electrically erasable and programmable read-only memory (EEPROM), flash memory, or any other type of non-volatile memory. At least some of the memory 206 can include a non-transitory computer-readable medium from which the processing device 202 can read instructions 208. A computer-readable medium can include electronic, optical, magnetic, or other storage devices capable of providing the processing device 202 with computer-readable instructions or other program code. Non-limiting examples of a computer-readable medium include magnetic disk(s), memory chip(s), ROM, random-access memory (RAM), an ASIC, a configured processor, optical storage, or any other medium from which a computer processor can read the instructions 208. In some examples, the instructions 208 may correspond to the service proxy 108 described in FIG. 1.

In some examples, the processing device 202 can execute the instructions 208 to perform some or all of the functionality described herein. For example, the processing device 202 can receive a request 118 for a computing operation 114 from the web application 106, determine if the computing operation 114 is executable by the local execution module 110, and transmit a communication 120 to either the local execution module 110 or the server-side system 116 based on the outcome of the determination. The communication 120 can be configured to cause the local execution module 110 or the server-side system 116, respectively, to execute the computing operation 114.

In some examples, the processing device 202 may also determine if the local execution module 110 is installed on the client-side system 102 and, if not, prompt a user of the client-side system 102 for permission to install the local execution module 110. Upon receiving permission to install the local execution module 110, the processing device 202 can transmit a request for the local execution module 110 to the server-side system 116 or another remote server, receive the local execution module 110 therefrom, and install the local execution module 110 onto the client-side system 102.

Figure 3:
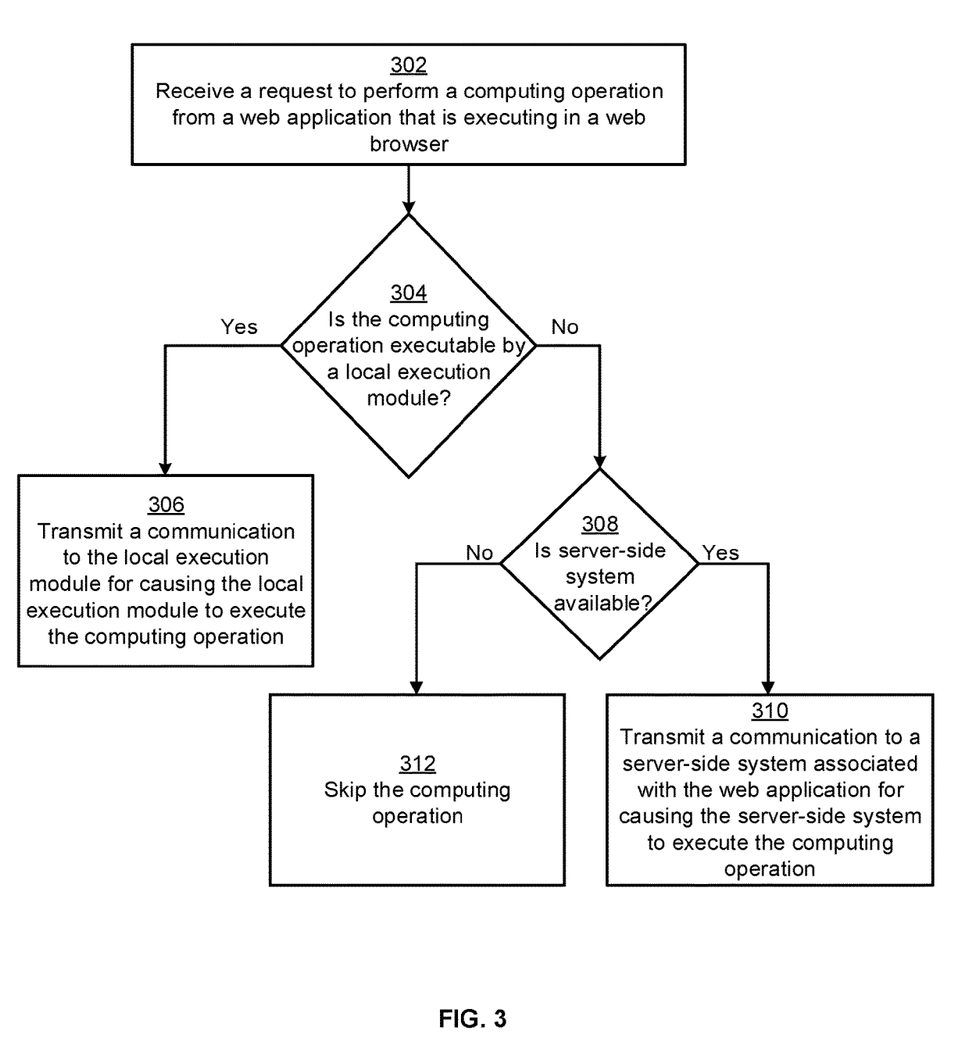
FIG. 3 is a flow chart of an example of a process for determining if a computing operation is executable by a local execution module according to some aspects of the present disclosure.
Figure 4:
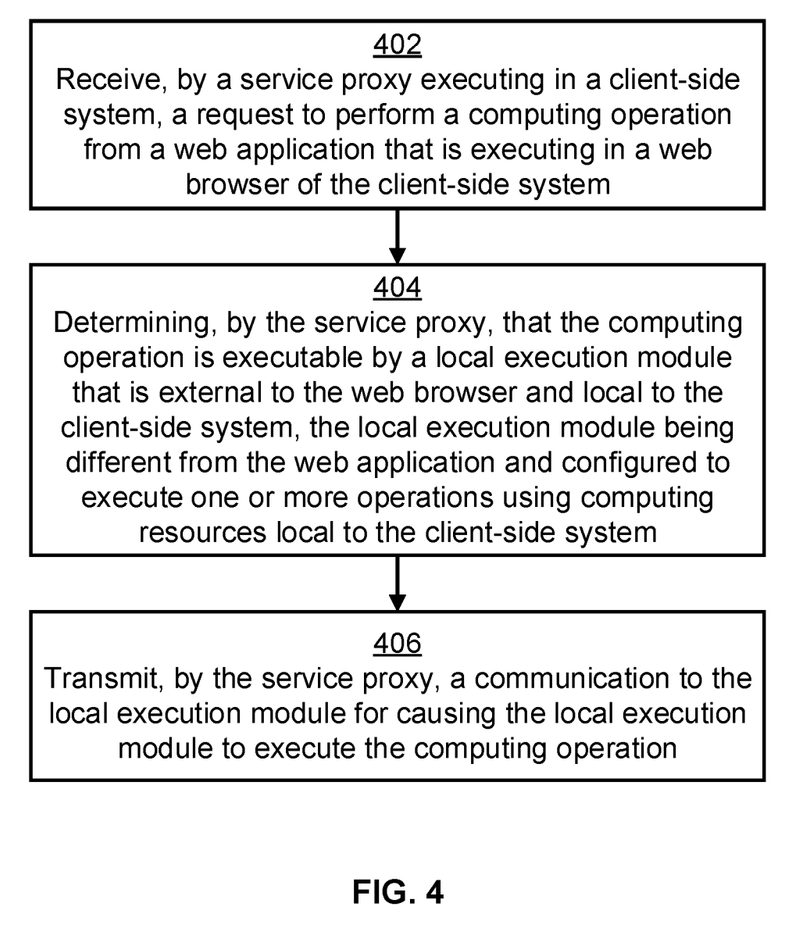
FIG. 4 is a flow chart of another example of a process for coordinating the execution of computing operations according to some aspects of the present disclosure.

In some examples, the processing device 202 can implement some or all steps shown in FIGS. 3-4. Other examples can include more steps, fewer steps, different steps, or a different order of the steps than is shown in FIGS. 3-4. The steps of FIGS. 3-4 are discussed below with reference to the components discussed above in relation to FIGS. 1-2.

Referring now to FIG. 3, at block 302, a service proxy 108 may receive a request 118 to perform a computing operation 114 from a web application 106 that is executing in a web browser 104 or from another type of application. The request 118 may be triggered by a user interacting with the web application 106. For example, a user may interact with the rendered web application 106 to configure a model or simulation. The interaction may trigger a request 118 to perform a corresponding computing operation 114. The request 118 may be transmitted from the web application 106 and received by the service proxy 108. For example, the web application 106 may transmit the request 118 to a port associated with the service proxy 108, from which the service proxy 108 can receive the request 118. Alternatively, the request 118 may be destined for a remote server but intercepted by the service proxy 108. In this way, the service proxy 108 may implement its functionality unbeknownst to the web application 106. As a result, the web application 106 may not need to be reprogrammed or reconfigured to work with the service proxy 108.

At block 304, the service proxy 108 may determine if the computing operation 114 is executable by the local execution module 110. In some examples, this may include accessing a list of predetermined computing operations 112, which may or may not be stored locally to the client-side system 102. If the requested computing operation 114 is included in the list of predetermined computing operations 112, the service proxy 108 may determine that the computing operation 114 is executable by the local execution module 110. For example, the list of predetermined computing operations 112 may include a list of identifiers (e.g., names or unique identification numbers) of computing operations that are executable by the local execution module 110, such as an computing operation for updating a model or a simulation. The service proxy 108 can compare an identifier of the requested computing operation 114 (which may be provided in the request) to the list of identifiers to determine whether the identifier of the requested computing operation 114 is on the list. If so, the service proxy 108 can determine that the local execution module 110 can perform the requested computing operation 114. Otherwise, the service proxy 108 can determine that the local execution module 110 cannot perform the requested computing operation 114. In other examples, the list of predetermined computing operations 112 may be stored on a remote computing device that is external to the client-side system 102. The service proxy 108 may communicate with the remote computing device via a network to determine whether the requested computing operation 114 is executable by the local execution module 110. For example, the service proxy 108 can provide an identifier of the requested computing operation 114 to the remote computing device, which can consult a list of identifiers corresponding to computing operations executable by the local execution module 110 to determine whether the requested computing operation 114 is executable by the local execution module 110 and return a response indicating the same.

If the service proxy 108 determines that the computing operation 114 is executable by the local execution module 110, the process continues to block 306. If the service proxy 108 determines that the computing operation 114 is not executable by the local execution module 110, the process continues to block 308.

At block 306, the service proxy 108 may transmit communication 120 to perform the computing operation 114 to the local execution module 110 for causing the local execution module 110 to execute the computing operation 114. In some examples, the communication 120 may be the same as the original request 118 received from the web application 106. Thus, the original request 118 can be forwarded to the local execution module 110 as the communication 120. Alternatively, the communication 120 may be a new request that is different from (e.g., in a different format from) the original request 118 received from the web application 106, where the communication 120 has data (e.g., a command) for causing the local execution module 110 to execute the requested computing operation 114.

The local execution module 110 can receive the communication 120 and responsively use computing resources 210 local to the client-side system 102 to execute the computing operation 114. For example, the local execution module 110 may access local storage to retrieve data stored thereon, import that data into a local memory, and then use a local processor to update a model stored in local memory based on the imported data. The local execution module 110 may then transmit the updated model to the web application 106 for display to the user.

At block 308, the service proxy 108 determines whether the server-side system 116 is available. For example, the service proxy 108 can ping or otherwise try to communicate with the server-side system 116. If the service proxy 108 determines that the server-side system 116 is unavailable, the process can proceed to block 312 where the computing operation can be skipped. Otherwise, the process can proceed to block 310.

At block 310, the service proxy 108 transmits a communication 120 to a server-side system 116 associated with the web application 106. In some examples, the communication 120 may be the same as the original request 118 received from the web application 106. Alternatively, the communication 120 may be a new request that is different from (e.g., in a different format from) the original request 118 received from the web application 106, where the communication 120 has data (e.g., a command) for causing the server-side system 116 to execute the requested computing operation 114. In some examples, the service proxy 108 may also transmit data related to the requested computing operation 114 to the server-side system 116. For example, the service proxy 108 may forward a model, or data to be inputted into the model, to the server-side system 116.

The server-side system 116 can receive the communication 120 and responsively execute the requested computing operation 114. The server-side system 116 can then return the results of the computing operation 114 to the client-side system 102 for the user. For example, the server-side system 116 may input data into a model and return the updated model to the web application 106 (or to the service proxy 108, which in turn can return the model to the web application 106).

FIG. 4 is a flow chart of another example of a process for coordinating the execution of computing operations according to some aspects of the present disclosure. At block 402, a service proxy 108 executing in a client-side system 102 receives a request 118 to perform a computing operation 114 from a web application 106 that is executing in a web browser 104 of the client-side system 102. Though, other examples may involve other types of applications that may or may execute on the client-side system outside of a web browser.

At block 404, the service proxy 108 determines that the computing operation 114 is executable by a local execution module 110. The local execution module 110 can be external to the web browser 104 and local to the client-side system 102. The local execution module 110 may be different from the web application 106 and may be configured to execute one or more computing operations using computing resources 210 local to the client-side system 102. In some examples, the service proxy 108 may determine that the computing operation 114 is executable by the local execution module 110 by accessing a list of predetermined computing operations 112 that is local to the client-side system 102, or by communicating with a remote server (e.g., a server-side system 116) that is separate from the client-side system 102.

At block 406, the service proxy 108 transmits a communication 120 to the local execution module 110 for causing the local execution module 110 to execute the computing operation 114. The local execution module 110 may be a daemon program that can, for example, access one or more local processing cores or local memory devices (e.g., RAM) to execute the computing operation 114.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, any examples described herein can be combined with any other examples to yield further examples.

What is claimed is:

1. A client-side system comprising:
   a processing device; and
   a non-transitory computer-readable memory comprising instructions for a service proxy, the service proxy being executable by the processing device to cause the processing device to:
   receive a request to perform a computing operation from a web application that is executable in a web browser of the client-side system;
   determine if the computing operation is executable by a local execution module by accessing a list of predetermined computing operations that are executable by the local execution module, wherein the local execution module is external to the web browser and local to the client-side system, the local execution module being different from the web application and configured to execute one or more computing operations using computing resources local to the client-side system, and the list of predetermined computing operations being local to the client-side system; and
   in response to determining that the computing operation is executable by the local execution module, transmit a communication to the local execution module for causing the local execution module to execute the computing operation.

2. The client-side system of claim 1, wherein the service proxy is executable in the web browser.

3. The client-side system of claim 1, wherein the service proxy is further executable by the processing device for causing the processing device to:
   in response to determining that the computing operation is not executable by the local execution module, transmit the communication to a server-side system associated with the web application for causing the server-side system to execute the computing operation, the server-side system being remote from the client-side system.

4. The client-side system of claim 1, wherein the service proxy is further executable by the processing device for causing the processing device to determine if the computing operation is executable by the local execution module by communicating with a server-side system associated with the web application, the server-side system being remote from the client-side system and being configured to convey to the service proxy which computing operations are executable by the local execution module.

5. The client-side system of claim 1, wherein the non-transitory computer-readable memory further includes instructions that are executable by the processing device for causing the processing device to:
   determine if the local execution module is installed on the client-side system; and
   in response to determining that the local execution module is not installed on the client-side system, prompt a user of the client-side system for permission to install the local execution module onto the client-side system.

6. The client-side system of claim 5, wherein the non-transitory computer-readable memory further includes instructions that are executable by the processing device for causing the processing device to:
   in response to receiving permission to install the local execution module onto the client-side system from the user:
   request the local execution module from a server-side system associated with the web application;
   receive the local execution module from the server-side system; and
   install the local execution module onto the client-side system.

7. A method comprising:
   receiving, by a service proxy executing in a client-side system, a request to perform a computing operation from a web application that is executing in a web browser of the client-side system;
   based on receiving the request, determining, by the service proxy, if the computing operation is executable by a local execution module by accessing a list of predetermined computing operations that are executable by the local execution module, wherein the local execution module is external to the web browser and local to the client-side system, the local execution module being different from the web application and configured to execute one or more computing operations using computing resources local to the client-side system, and the list of predetermined computing operations being local to the client-side system; and in response to determining that the computing operation is executable by the local execution module, transmitting, by the service proxy, a communication to the local execution module for causing the local execution module to execute the computing operation.

8. The method of claim 7, wherein the service proxy is executing in the web browser.

9. The method of claim 7, further comprising:

receiving, by the service proxy, another request to perform another computing operation from the web application;

based on receiving the other request, determining, by the service proxy, that the other computing operation is not executable by the local execution module; and in response to determining that the other computing operation is not executable by the local execution module, transmitting, by the service proxy, another communication to a server-side system associated with the web application for causing the server-side system to execute the other computing operation, the server-side system being remote from the client-side system.

10. The method of claim 7, further comprising:

determining, by the service proxy, that the computing operation is executable by the local execution module based on the computing operation being in the list of predetermined computing operations.

11. The method of claim 7, further comprising determining that the computing operation is executable by the local execution module by:

communicating, by the service proxy, with a server-side system associated with the web application, the server-side system being remote from the client-side system and being configured to convey to the service proxy which computing operations are executable by the local execution module.

12. The method of claim 7, further comprising:

determining, by the client-side system, that the local execution module is not installed on the client-side system; and in response to determining that the local execution module is not installed on the client-side system, prompting, by the client-side system, a user of the client-side system for permission to install the local execution module onto the client-side system.

13. The method of claim 12, further comprising:

in response to receiving permission to install the local execution module onto the client-side system from the user:

requesting, by the client-side system, the local execution module from a server-side system associated with the web application;

receiving, by the client-side system, the local execution module from the server-side system; and installing, by the client-side system, the local execution module onto the client-side system.

14. A non-transitory computer-readable medium comprising program code that is executable by a processing device for causing the processing device to:

receive, at a service proxy, a request to perform a computing operation from a web application that is executable in a web browser of a client-side system;

determine, by the service proxy, if the computing operation is capable of being executed by a local execution module by accessing a list of predetermined computing operations that are executable by the local execution module, wherein the local execution module is external to the web browser and local to the client-side system, the local execution module being different from the web application and configured to execute one or more computing operations using computing resources local to the client-side system, and the list of predetermined computing operations being local to the client-side system; and in response to determining that the computing operation is capable of being executed by the local execution module, transmit, by the service proxy, a communication to the local execution module for causing the local execution module to execute the computing operation.

15. The non-transitory computer-readable medium of claim 14, further comprising program code that is executable by the processing device to:

in response to determining that the computing operation is not capable of being executed by the local execution module, transmit the communication to a server-side system associated with the web application, the server-side system being remote from the client-side system and configured to execute the computing operation.

16. The non-transitory computer-readable medium of claim 14, further comprising program code that is executable by the processing device to;

determine if the computing operation is capable of being executed by the local execution module by communicating with a server, the server being remote from the client-side system and being configured to convey to the processing device which computing operations are capable of being executed by the local execution module.

17. The non-transitory computer-readable medium of claim 14, further comprising program code that is executable by the processing device for causing the processing device to:

determine that the local execution module is not installed on the client-side system; and in response to determining that the local execution module is not installed on the client-side system, prompt a user of the client-side system for permission to install the local execution module onto the client-side system.

18. The non-transitory computer-readable medium of claim 14, wherein the request is a first request, and further comprising program code that is executable by the processing device for causing the processing device to transmit the communication to the local execution module by:

generating a second request that is in a format different from the first request, the second request being associated with the computing operation; and transmitting the second request to the local execution module for causing the local execution module to execute the computing operation.

\* \* \* \* \*